F. C. FISCHER.
MEANS FOR MANUFACTURING AN ARTICLE OF A PLURALITY OF PARTS.
APPLICATION FILED SEPT. 22, 1919.
1,430,634. Patented Oct. 3, 1922.
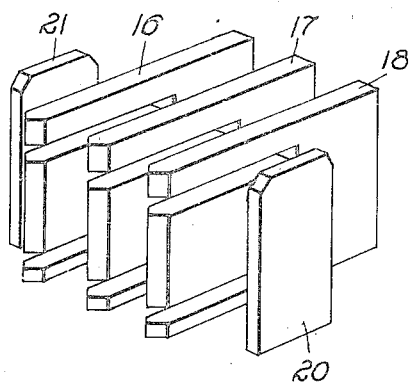
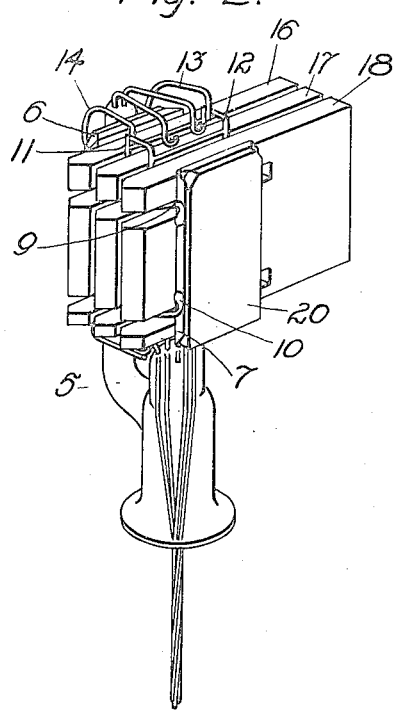
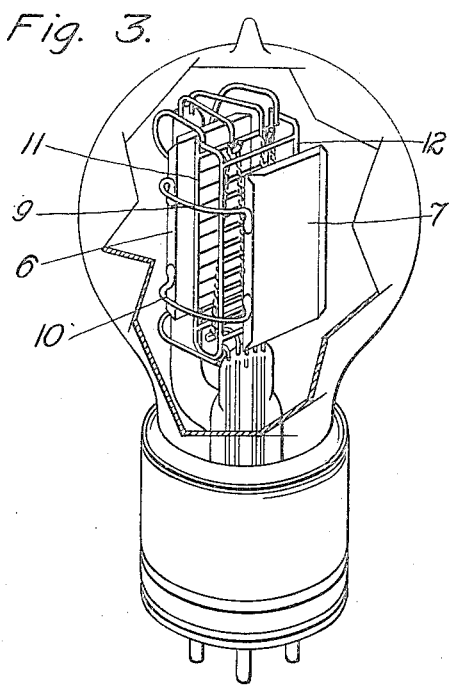
Inventor:
Frederick C. Fischer.
by J. E. Roberts
Att'y.

Patented Oct. 3, 1922.

1,430,634

UNITED STATES PATENT OFFICE.

FREDERICK C. FISCHER, OF BERWYN, ILLINOIS, ASSIGNOR TO WESTERN ELECTRIC COMPANY, INCORPORATED, OF NEW YORK, N. Y., A CORPORATION OF NEW YORK.

MEANS FOR MANUFACTURING AN ARTICLE OF A PLURALITY OF PARTS.

Application filed September 22, 1919. Serial No. 325,375.

*To all whom it may concern:*

Be it known that I, FREDERICK C. FISCHER, a citizen of the United States, residing at Berwyn, in the county of Cook, State of Illinois, have invented certain new and useful Improvements in Means for Manufacturing an Article of a Plurality of Parts, of which the following is a full, clear, concise, and exact description.

This invention relates to the manufacture of an article of a plurality of parts and more particularly it relates to means for accurately aligning the electrodes of a vacuum tube.

This invention will be hereinafter described in detail in connection with the manufacture of a vacuum tube of the type containing more than one electrode. In the manufacture of such vacuum tubes, it is frequently desirable that a plurality of tubes be manufactured that have similar electrical characteristics so that in a given electrical circuit, one tube may be substituted for another without necessitating any changes in the circuit to produce the same results. Since any variation in the space relation of the electrodes for the tubes would produce tubes of different electrical characteristics, the aligning means of this invention has been provided to insure that the desired spaced relation of the electrodes is maintained in the manufacture of a set of tubes.

This invention comprises a set of gauges that may be inserted between the electrode members of a vacuum tube structure after the electrodes have been fastened to their supporting stem, but before the stem has been inserted and sealed in the bulb of the tube. If each of the gauges has a thickness equal to the distance desired between two members of the electrode structure, pressure may be exerted on the electrodes after each gauge has been inserted in its proper position to bend the supporting wires of the electrodes that may be out of alignment so that when the gauges are removed the supporting wires will be bent permanently in the form necessary to hold the electrodes in the proper space relation with respect to each other. In case the two outside members of the electrode structure have extensive flat surfaces, it may also be desirable to provide plates which may be placed against the outer surface of the two members and the pressure applied between the two plates to force the electrodes into position. With the set of gauges in position, the set comprises a compact structure which may be turned in either a vertical or horizontal plane to align the electrode structure with its supporting stem.

This invention will be better understood by reference to the following detailed description taken in connection with the accompanying drawings in which Fig. 1 represents a set of gauges constructed according to the present invention; Fig. 2 illustrates the set of gauges inserted between the various members of an electrode structure in order to secure the proper spacing of the electrode members; and Fig. 3 represents the electrode structure of Fig. 2 embodied in a vacuum tube.

The set of gauges illustrated in Fig. 1 is adapted to be used with the particular type of electrode structure illustrated in Figs. 2 and 3. 5 is a suitable electrode supporting stem which, by means of connecting wires (not shown) serve to support the plate 6 of the electrode structure proper. Plate 7 is supportingly connected to plate 6 and spaced therefrom by means of a plurality of horizontal wires 9 and 10. The two portions 11 and 12 of the grid member of the electrode structure are supportingly connected to the stem 5 by wires 13 and 14. The particular set of gauges illustrated in Fig. 1 as comprising gauges 16, 17, 18 and end members 20, 21 is designed to secure the proper alignment and spacing of plates 6 and 7 and grid 11 after these electrodes have been mounted on the stem 5. Gauge 16 should be of such a width that when it is inserted between plate 6 and the portion 11 of the grid and the plate 6 and grid 11 are pressed against the sides of gauge 16, the proper spacing and alignment are obtained for these two electrode members. Gauge 17 should be of such thickness that when it is inserted between portions 11 and 12 of the grid and these portions are pressed against the flat surfaces of gauge 17, these two portions are properly spaced and aligned with respect to each other. Similarly, gauge 18 which is to be inserted between portion 12 of the grid and plate 7 should have a thickness equal to the distance desired between these two electrode members. 20 is a block which is provided for the outer surface of plate electrode 7, and 21 is a similar block provided for the outer surface of plate electrode 6.

When pressure is applied between blocks 20 and 21, the supporting wires of the various electrode members will be so bent that when the gauges are removed, the electrode members will be held by their supporting wires in the proper special relation with respect to each other. Blocks 20 and 21 serve to distribute the applied pressure uniformly over the plate electrodes so as to prevent the pressure from causing any irregularity in the flat surfaces of the plate electrodes 6 and 7. After the pressure has been applied the planes of the electrode members are aligned properly with respect to the stem 5 in either a vertical or a horizontal plane by turning the gauges as a unit through a suitable angle. In order that the gauges 16, 17 and 18 may be inserted readily and still cover substantially the entire surfaces of the electrode members, each of these gauges should be slotted on account of horizontal supporting wires 9 and 10, which connect the two plates 6 and 7.

After pressure has been applied to plates 6 and 7, the gauge pieces may be removed and the electrode structure is then ready to be sealed in a glass envelope to form a vacuum tube such as the one shown in Fig. 3.

It is evident that the thickness of the gauge pieces will be determined by the distance desired between the various members of the electrode structure and that this distance will vary with the type of tube to be manufactured. It is to be understood that these gauge pieces may be considerably modified to adapt them to any particular type of electrode structure with which they are to be employed.

What is claimed is:

1. Means for arranging the members of a vacuum tube electrode structure, said means comprising a set of gauges adapted to be removably placed between said members to locate said electrodes with respect to each other.

2. Means for arranging the members of a vacuum tube electrode structure, said means comprising a set of gauges adapted to be removably placed in contact with said electrodes to fix the space relation of said electrodes with respect to each other, each of said gauges having two flat surfaces substantially as large as the surfaces of the electrodes with which the gauge is in contact.

3. Means for arranging the members of a vacuum tube electrode structure, said means comprising a set of gauges adapted to be removably placed in contact with said electrodes to fix the space relation of said electrodes with respect to each other, each of said gauges being sufficiently extended to provide a handle therefor.

4. Means for arranging a plurality of members composing a vacuum tube electrode structure between two of which members extend supporting wires, said means comprising a plurality of spacing elements for determining the distance between the electrode members, each of said spacing elements being slotted to receive said wires.

5. Means for arranging a plurality of members composing a vacuum tube electrode structure, said means comprising a set of gauges adapted to be inserted between said members for fixing the space relation of said members with respect to one another, each of said gauges having two flat surfaces substantially as large as the surfaces of the electrodes between which the gauge is inserted, and a block for the outer surface of each of the two outer members of the said electrode structure, each of said blocks having a flat surface substantially the same size as the outer surface of said outer electrodes.

6. Means for arranging a plurality of members composing the electrode structure of a vacuum tube, the outer members of said structure being flanged, said means comprising a set of gauges adapted to be inserted between said members for fixing the space relation of said members with respect to each other, each of said gauges having two flat surfaces substantially as large as the surfaces of the electrodes between which the gauge is inserted and a block for the outer surface of each of the two outer members of said electrode structure, each of said blocks having a flat surface of substantially the same size as that portion of the outer electrodes surrounded by the flange.

7. An adjusting device for electrodes comprising a plurality of plates adapted to be inserted between and around said electrodes whereby said electrodes may be maintained in their proper space relation while being adjusted as a unit.

In witness whereof, I hereunto subscribe my name this 11 day of Sept. A. D., 1919

FREDERICK C. FISCHER.